April 30, 1957 — F. H. GREEN — 2,790,310
AXIAL FLOW VORTEX TUBE MECHANISM
Original Filed Oct. 30, 1953 — 3 Sheets-Sheet 1
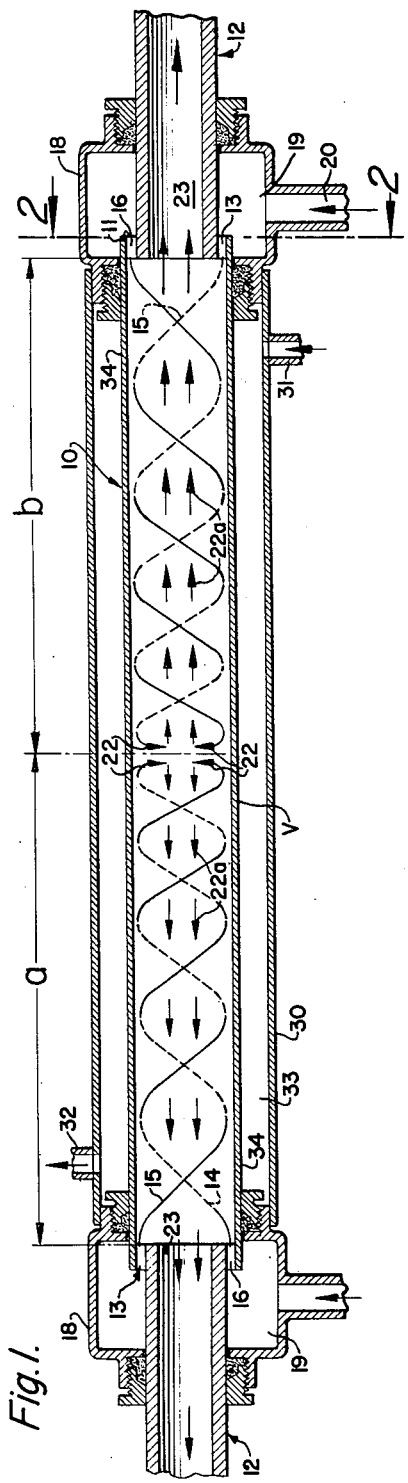
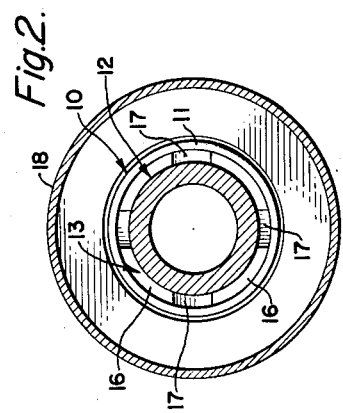
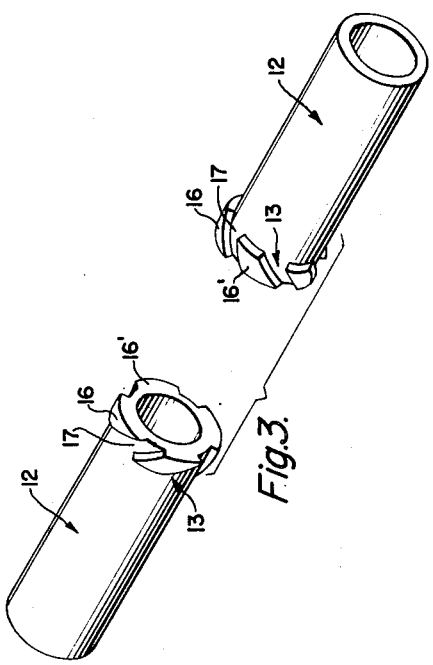
FREDERICK H. GREEN,
INVENTOR.

April 30, 1957 F. H. GREEN 2,790,310
AXIAL FLOW VORTEX TUBE MECHANISM
Original Filed Oct. 30, 1953 3 Sheets-Sheet 2

FREDERICK H. GREEN,
INVENTOR.

BY John H. J. Wallace

April 30, 1957  F. H. GREEN  2,790,310
AXIAL FLOW VORTEX TUBE MECHANISM
Original Filed Oct. 30, 1953  3 Sheets-Sheet 3
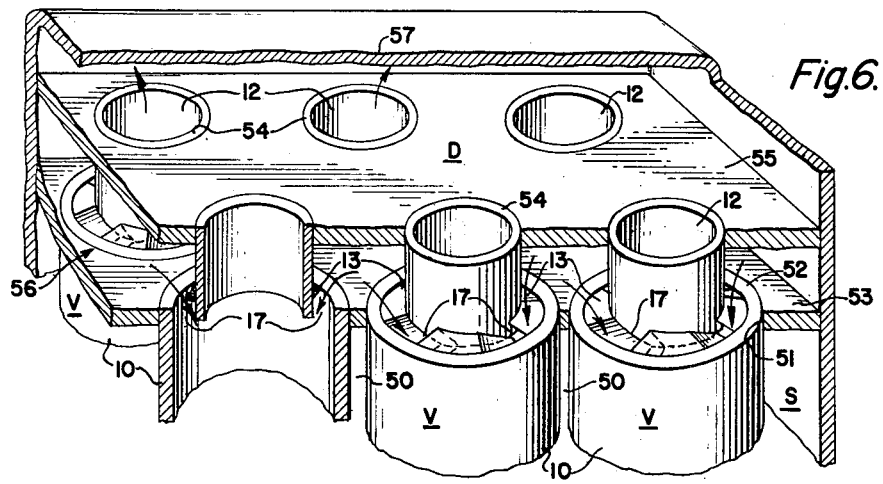
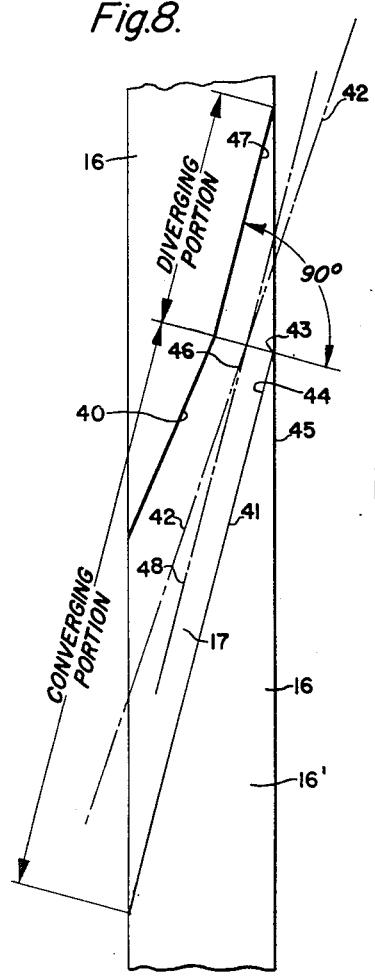
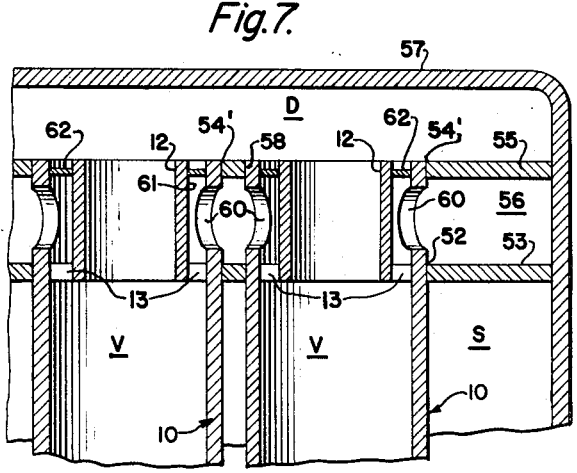
FREDERICK H. GREEN,
INVENTOR.
BY John H. G. Wallace United States Patent Office 2,790,310
Patented Apr. 30, 1957

2,790,310
AXIAL FLOW VORTEX TUBE MECHANISM

Frederick H. Green, Palos Verdes Estates, Calif., assignor to The Garrett Corporation, Los Angeles, Calif., a corporation of California Continuation of application Serial No. 389,443, October 30, 1953. This application November 23, 1954, Serial No. 470,726

13 Claims. (Cl. 62—136)

This invention relates to means for cooling a flow of a gaseous medium and relates in particular to a cooling device having a vortex tube cooler element. This application is a continuation of my application Serial No. 389,443, filed October 30, 1953, now abandoned.

It is an object of the invention to provide a vortex tube cooling device having greater efficiency by reason of a larger number of vortex tubes in a given space and a better dissipation of heat from each vortex tube.

A further object of the invention is to provide a vortex tube cooling device having novel inlet nozzles for the inlet of the gaseous medium which is to be cooled, these nozzles being so positioned as to impart an axial component to the motion of the gaseous medium, so that the streams of gaseous medium directed into the tube will to a greater extent follow helical paths along the inner surface of the wall of the tube, whereby the air will flow a greater distance along the interior of the tube before turning radially inwardly and then flowing axially to the tube outlet. The helically disposed inlet nozzle passages are arranged at such angles that the streams of gaseous medium delivered into the vortex tube have in addition to a tangential force component an axially directed force component of such magnitude as to cause the streams of gaseous substance to flow along the inner surface of the vortex tube, substantially to the rear end thereof, thereby increasing the effectiveness of the vortex tube as a cooling means.

In order to construct a vortex tube having useful cooling efficiency, it is desirable that a substantial amount of the inlet air (preferably all of it) be made available as cooled air. In the tubes of larger diameter, such is easily accomplished. However, in the smaller tubes of the prior art, say ½-inch outside diameter thin-wall tube, or less, it has been found necessary to bleed off at the hot end a substantial amount of the inlet air in order to obtain cooled air. As the amount of hot air bleed was reduced, the cooling effect was disproportionately decreased, and at zero hot bleed, the cooling effect was near zero. From this and other observations, it was deduced that the helical sheet flow of the inlet air was not being maintained for any substantial distance down the tube from the nozzle, but was being literally short-circuited directly out through the outlet for cooled air, hence was not obtaining the novel cooling effect inherent in the vortex tube construction.

It is therefore an object of this invention to provide a vortex tube construction in which tube size is less of a critical factor, as regards the practical cooling efficiency of the tube, than in tubes of the prior art.

It is a particular object of the invention to provide in a vortex tube nozzle means capable of causing the inlet air to maintain a helical sheet flow for a substantial distance along the tube where a substantial portion or all of the inlet air is to be extracted from the cooled air outlet, and wherein the size of the tube does not present a critical limitation to the maintenance of such a sheet flow and whereby it is possible to maintain the required flow configuration which results in cooling.

It is also an object to provide a new and improved nozzle means requiring no structure radially larger than the vortex tube itself, whereby a plurality of tubes may be nested as closely as desired, even touching one another if heat transfer requirements so dictate.

Still another object is to provide a dual entry and discharge vortex tube in which by proportioning the entering streams of fluid it is possible to proportion the discharges of fluid.

It is a further object of the invention to provide a vortex tube cooling device having a tubular wall of heat conductive material and means which will direct the gaseous substance to be cooled into the interior of the tubular wall along helical lines, so that the stream of gaseous substance will flow along a substantial length of the tubular wall and effectively transfer heat thereto, such heat being conducted through the tubular wall to the exterior and dissipated.

It is an object of the invention to provide inlet nozzle means which will accelerate entering air in the proper direction and in the shortest distance, thereby obtaining optimum travel of air along the length of the tube for any given condition of operation, an important object of the invention being to provide a means for increasing the cooling efficiency of vortex tubes of small diameter.

A further object of the invention is to provide a vortex tube having inlet nozzle means which may be easily fabricated and which is adapted to be easily made on known screw thread grinding or milling machines or as a simple die casting.

A further object is to provide a means for increasing the efficiency of vortex tubes which have little or no bleed off from the end of the tube opposite from the nozzle.

It is a further object of the invention to provide a vortex tube cooling device of the character set forth in the preceding paragraph having means for effecting removal of heat from the heat-conductive tubular wall, and it is a further object of the invention to provide in this cooling device means for bringing a cooling medium into heat exchange relation to the heat-conductive tubular wall.

A further object of the invention is to provide a vortex tube cooling device having at the opposite ends of its tubular wall means forming helically disposed inlet nozzle passages to direct the gaseous medium to be cooled helically into opposite ends of the interior of the tubular wall, there being an outlet for cooled gaseous substance at each end of the tubular wall.

Further objects and advantages of the invention may be brought out in the following part of the specification wherein a preferred embodiment of the invention has been described in detail for the purpose of teaching skilled persons how the invention may be employed, without, because of the detailed disclosure, limiting the scope of the invention defined in the appended claims.

Referring to the drawings which are for illustrative purposes only:

Fig. 1 is a sectional view of one form of the invention;

Fig. 2 is a cross section taken as indicated by the line 2—2 of Fig. 1;

Fig. 3 is a perspective view showing the manner in which helical inlet nozzle passages are formed on the respective outlet tubes of the device;

Fig. 6 is a fragmentary sectional view showing a cooling device forming a part of my present invention wherein closely arranged tubes are connected to a manifold;

Fig. 7 is a fragmentary sectional view showing another manner of connecting the vortex tubes of my invention to a manifold;

Fig. 8 is a diagrammatic plan view showing a nozzle forming wall rolled out flat.

Figure 4:
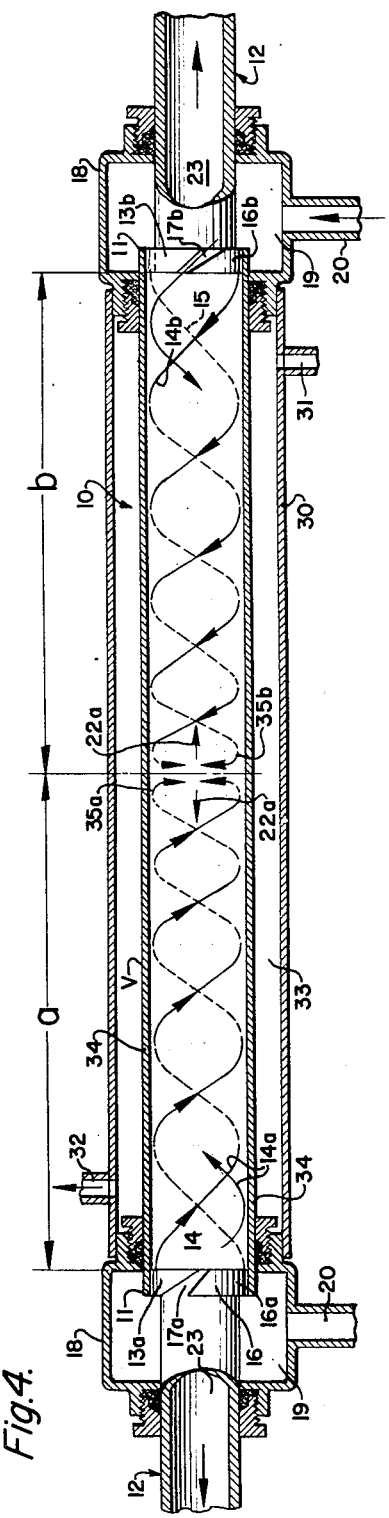
Fig. 4 is a sectional view similar to Fig. 1 but showing nozzles arranged to rotate the inlet streams of gaseous fluid in the same direction.

The vortex tube cooling device shown in Fig. 1 includes a vortex tube V having a tubular wall 10 of heat conductive material such as one of the heat conductive metals. At each end 11 of the tubular wall 10 there is an outlet tube 12 for cooled gaseous medium. The tubes 12 are of smaller internal diameter than the tubular wall 10.

Nozzle means 13 are provided at the ends 11 of the tubular wall 10 for delivery into the interior of the tubular wall 10 the gaseous medium which is to be cooled. The nozzle means 13 are adapted to deliver into the ends of the tubular wall 10 streams of gaseous fluid which follow helical paths such as indicated by the lines 14 and 15.

In the form of the invention disclosed, the nozzle means 13 comprise wall members 16, Figs. 2 and 3, arranged to define inlet nozzle passages 17 disposed on substantially helical paths so as to direct streams or jets of the gaseous substance to be cooled helically into the ends of the tubular wall 10. The outlet tubes are described as having grooved collars 16' on the ends thereof. In the machining of the tubes 12, collars are left on the inner ends thereof after which the nozzle opening flutes or channels 17 are cut, leaving the remaining wall portions 16 of the collars 16'. The wall portion 16 is of such diametral dimension that the nozzle means 13 may be pressed into the ends 11 of the tubular wall 10 in the manner shown in Fig. 1. Then, the inner ends of the outlet tubes 12 extend into the ends 11 of the tubular wall 10 and the helical inlet nozzle passages 17 lie between the overlapping ends of the tubes 12 and the wall 10.

Inlet chamber members 18 are provided in surrounding relation to the cooperating ends of the tubes 12 and the wall member 10, to provide inlet manifolds 19 communicating with the outer ends of the nozzle passages 17. The chamber members 18 are provided with inlet openings 20 through which the gaseous substance to be cooled is fed under pressure to the manifold spaces 19. The jets or streams of gaseous substance are formed by the helical nozzle passages 17 and pass helically into the ends of the tubular wall 10 and follow the helical paths 14 and 15 along the inner surface of the wall 10 toward the center thereof. The nozzle passages 17 at the opposite ends of the tubular wall 10 are shown as being of opposite hand, so that the helical paths from the opposite ends of the tubular wall 10 are respectively of righthand and lefthand rotation around the axis of the tubular wall 10 when considered from the respective ends of the tubular wall 10, so that the streams of the gaseous substance following the respective paths 14 and 15, when considered simultaneously as they come together at the center of the tubular wall 10, are rotating in the same direction. Theoretically, an effective portion of each inward flow of gaseous medium as indicated by the lines 14 and 15, Fig. 1, reaches an intermediate portion of the tube 10 before it turns radially inwardly as indicated by arrows 22 and then flows, as schematically indicated by the arrows 22a, along the axis of the tubular wall 10 toward the outlet openings 23 defined by the outlet tubes 12.

The invention provides as a means for continuously removing heat from the heat conductive wall 10 a means for bringing a cooling medium into heat exchange relation thereto. A jacket 30 is disposed around the tubular wall 10 and inlet and outlet openings 31 and 32 are provided which communicate with the jacket space 33. The cooling medium such as air or water, for example, is passed through the space 33 so that heat is continuously extracted from the tubular wall 10.

During the poration of the device, portions of the tube 10, such as the portions 34, are at a temperature elevated above that of the fluid incoming at the inlet 20. Therefore, to obtain an effective refrigerating machine, the temperature of the coolant fed into the space 33 need only be lower than the temperature of the hottest portion of the tube 10.

In Fig. 4, many parts are shown which were previously described with relation to Fig. 1. Accordingly, these parts will be indicated by the same numerals as employed in Fig. 1. The outlet tubes 12 of Fig. 4 are provided respectively with nozzle means 13a and 13b having annular walls 16a and 16b in which inlet nozzle passages 17a and 17b are formed, these nozzle passages being of the same hand when each is viewed from its respective end of the tubular wall 10, so that the respective streams of gaseous fluid 14a and 14b will have opposing spins or rotations about the axis of the tubular wall 10. The arrows 35a and 35b indicate a turning inwardly of the fluid streams at an intermediate point in the tube 10. Whether the zone of meeting of the air streams from the opposite ends of the tube 10 will be in the center thereof or to a side of the center will depend, of course, upon the relative pressures and velocities of the air streams. Also, it is expected that there will be some intermingling of the flows of air from the respective nozzle passages at the opposite ends of the tube 10 in the zone of meeting of these air flows. These observations apply also to Fig. 1. The tubular wall 10 may be regarded as consisting of two vortex tube sections a and b meeting in a transverse plane between the ends of the tubular wall 10, but since there is no physical dividing wall between these tube sections some of the air entering at one end of the tubular wall 10 may pass out through the cooled air outlet tube 12 at the opposite end of the cooling device.

Figure 5:
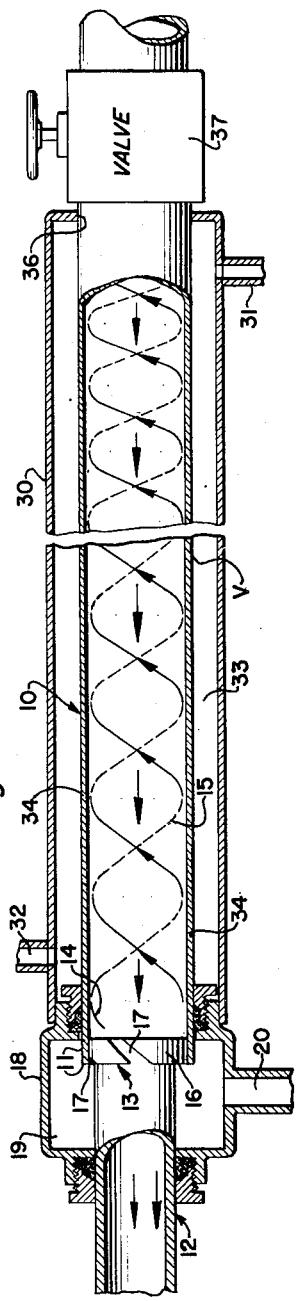
Fig. 5 is a schematic sectional view showing a form of the invention having inlet nozzles at one end only.

In Fig. 5, I show an alternative form of the invention having nozzle means 13 disposed at one end of a heat conductive tube 10. At the front end 11 of the tube 10 a cooled air outlet tube 12 is arranged. On the portion of the tube 12 which projects into the end 11 of the tube 10 there are helically arranged inlet nozzle passages 17. By "helically arranged," I mean that each nozzle passage 17 is arranged on a helical line 14 around the axis of the tube 10. The inlet nozzle passages 17 are arranged in a circle around the interior of the end 11 of the tube 10, but each of these passages 17 lies on a separate helix, so that the paths of flow of the gaseous fluid into the tube 10, indicated by lines 14 and 15 will follow helices along the interior of the tube. At the rear end 36 of the tube 10 a means, shown as a valve 37 is provided for enabling a controlled flow of gaseous medium from the rear end of the tube. The valve 37 likewise provides a means for completely closing the rear end 36 of the tube 10 so that there will be no issue of air therefrom, and therefore all of the air which enters the nozzle passages 11 will be discharged through the outlet tube 12. This form of the invention is provided with the previously described air inlet manifold 18 provided with an inlet 20 whereby gaseous fluid may be delivered into the manifold space 19. The form of the invention shown in Fig. 5 also has means for extracting heat from the tube 10, such means consisting of a tubular jacket 30 having inlet and outlet openings 31 and 32 communicating with the space 33 surrounding the tube 10, whereby a suitable coolant may be caused to flow across the surface of the tube 10 and extract heat which is conducted outwardly by the heat conductive wall of the tube 10 from the helically swirling air or other gaseous medium within the tube indicated by the lines 14 and 15.

In Fig. 8, I show a portion of the collar 16' having one of the inlet nozzle wall members 16 for forming channels or flutes 17. This flute 17 is defined by side walls 40, 41 and 47. The side walls 40 and 41 are disposed on opposite sides of a diagonal center line 42 and converge to a throat 43. The front end 44 of the wall 41 intersects the wall surface 45 of the collar 16 and the front end 46 of the wall 40 intersects a wall 47 which is parallel to the wall 41 and diverges from the center line 42. The center line 42 between the parallel walls 41 and 47 intersects the center line 42 at the throat 43.

It is possible to form the flute 17 with two screw machine settings, one of which is employed during the cutting of the walls 41 and 47 and the other of which is employed during the cutting of the wall 40. A cutting tool having a width equal to the width of the throat 43 may be used to cut both the side walls 41 and 47, after which a narrower cutter may be employed to cut the side wall 40 in converging relation to the side wall 41. Alternatively, a single cutter could be employed to make three passes for the generation of the side walls. By way of example, for either forming operation the part 12 could be set up in a thread cutting machine indexed for four flutes at a selected lead, for example, 2.5 threads per inch. A pass would then be made for each flute and the flute side walls 41 and 47 would be generated. Then the machine would be set for 1.5 threads per inch and the passes for the respective flutes would generate the convergent side wall 40.

It will be understood by those skilled in the art that the axial flow nozzle of the present invention need not be necessarily formed in the manner described, but could, for example, be produced as a die casting. It is also within the contemplation of the invention that the axial flow nozzle wall members and the vortex tube itself could be formed integrally as a die casting, for example.

In operation, the gaseous fluid entering the converging portion of the flute 17 is accelerated through the throat 43 in a direction which gives it an axial component as well as a tangential or circumferential component of velocity, thus forming a positive helical flow of air into the diverging portion of the flute. The wall 47, in cooperation with the throat 43 forms an embouchure or passageway opening into the vortex tube proper which restricts the gaseous fluid to a helical flow with a minimum disturbing effect on the flow.

Fig. 6 shows a cooling device having vortex tubes V arranged so that they are close together. The tubular walls 10 thereof are disposed with narrow air circulation spaces 50 between them. In view of the fact that the air inlet nozzle means 13 do not project radially beyond the surfaces of the tubular walls 10, as is found in the prior art, they do not interfere with the close spacing of the vortex tubes V and therefore a maximum number of the tubes V may be arranged in a given space.

In the cooling device shown in Fig. 6, the ends 51 of the tubular walls 10 are seated in openings 52 of a plate 53, and the tubular air outlet members 12 of the vortex tubes V extend through openings 54 in a plate 55 shown as being disposed in parallel relation to the plate 53 so that an air inlet manifold chamber or passage 56 is formed between the plates 53 and 55, communicating with the air inlet nozzle passages 17 of the nozzle means 13. The wall 53 forms one margin of a space S through which a coolant fluid is passed so that it will be brought into contact with the outer surfaces of the tubular walls 10 of the vortex tubes V which project into the space S. The gaseous medium, cooled by the vortex tubes V passes into a duct or space D which is formed in part by the plate 55 and a shell wall 57 of the cooling device.

The cooling device fragmentarily shown in Fig. 7 is quite similar to that which is shown in Fig. 6. It has plates 53 and 55 defining the air inlet manifold 56, a space S for the coolant fluid and a duct D for the cooled gaseous medium. The principal differences of Fig. 7 from Fig. 6 are that the opening 54' of the plate 55 is of the same diameter as the opening 52 in the plate 53 and the tubular walls 10 of the vortex tubes are extended upwardly so as to surround the outlet tubes 12 and so as to project into the openings 54'. The upwardly extended portions 58 of the tubular walls 10 are provided with side openings 60 through which the gaseous medium to be cooled may pass from the manifold space 56 to the inlet nozzle means 13 of the vortex tubes V. The upper ends of the annular spaces 61 between the tubular members 12 and the extensions 58 of the tubular walls 10 are closed by rings 62.

I claim:

1. In a vortex tube device for cooling a flow of gaseous substance: a tubular wall having at each end thereof an outlet opening for cooled gaseous substance; wall means at the ends of said tubular wall in surrounding relation to said outlet openings defining helically directed nozzle passages arranged to direct streams of the gaseous substance toward the middle portion of the tubular wall and helically along the inner surface of the tubular wall; and means for directing the gaseous substance to be cooled to the inlets of said nozzle passages.

2. In a vortex tube device for cooling a flow of gaseous substance: a tubular wall of heat conductive material having at each end thereof an outlet opening for cooled gaseous substance; wall means at the ends of said tubular wall in surrounding relation to said outlet openings defining helically directed nozzle passages arranged to direct streams of the gaseous substance toward the middle portion of the tubular wall and helically along the inner surface of the tubular wall; means for effecting removal of heat from said tubular wall; and means for directing the gaseous substance to be cooled to the inlets of said nozzle passages.

3. In a vortex tube device for cooling a flow of gaseous substance: a tubular wall of heat conductive material having at each end thereof an outlet opening for cooled gaseous substance; wall means at the ends of said tubular wall in surrounding relation to said outlet openings defining helically directed nozzle passages arranged to direct streams of the gaseous substance toward the middle portion of the tubular wall and helically along the inner surface of the tubular wall; means for bringing a cooling medium into heat exchange relation to said tubular wall to cool the same during the operation of the vortex tube device; and means for directing the gaseous substance to be cooled to the inlets of said nozzle passages.

4. In a vortex tube device for cooling a flow of gaseous substance: a tubular wall of heat conductive material with an outlet opening for cooled gaseous substance at the end thereof; wall means at said end of said tubular wall in surrounding relation to said outlet opening defining helically directed inlet nozzle passages arranged to direct streams of gaseous substance into the interior of said tubular wall and away from said outlet opening so that said streams will follow helical paths along the inner surface of said tubular wall; means for effecting removal of heat from said tubular wall; means for delivering the gaseous substance to be cooled to the inlet of said nozzle passages; and means enabling a controlled flow from the opposite end of said tubular wall.

5. In a vortex tube device for cooling a flow of gaseous substance: a tubular wall of heat conductive material with an outlet opening for cooled gaseous substance at the end thereof; wall means at said end of said tubular wall in surrounding relation to said outlet opening defining helically directed inlet nozzle passages arranged to direct streams of gaseous substance into the interior of said tubular wall and away from said outlet opening so that said streams will follow helical paths along the inner surface of said tubular wall; means for bringing a cooling medium in heat exchange relation to said tubular wall to cool the same during the operation of the device; means for delivering the gaseous substance to be cooled to the inlet of said nozzle passages; and means enabling a controlled flow from the opposite end of said tubular wall.

6. In a vortex tube cooling device for a flow of gaseous substance: a cooling tubular wall; an outlet tubular wall of smaller diameter than said cooling tubular wall extending into the end of said cooling tubular wall; and a grooved collar on the end of said outlet tubular wall which extends into the end of said cooling tubular wall, the grooves of said collar being helically directed so as to form inlet nozzle passages which will direct the gaseous substance into the cooling tubular wall in a manner to follow helical paths along the inner surface of the cooling tubular wall, each of said nozzle passages having a converging portion defined by first and second side walls which converge from the front face of the collar to a throat one side of which is contiguous to the rear face of the collar, and a third side wall extending from the other side of said throat to the rear face of said collar in diverging relation to the center line of the converging portion of the nozzle passages.

7. In inlet nozzle forming means for a vortex cooling tube: an outlet tubular wall having a grooved collar adjacent one end thereof, the grooves of said collar being helically directed so as to form inlet nozzle passages, each of said nozzle passages having a converging portion defined by first and second side walls which converge from the front face of the collar to a throat one side of which is contiguous to the rear face of the collar, the first of said side walls extending from the front face to the rear face of the collar, and a third side wall parallel to said first side wall extending from the rear face of the collar to intersect said second side wall at the remaining side of said throat.

8. A gaseous fluid inlet nozzle for a vortex tube, comprising a plug having an outer peripheral surface adapted to be received within said vortex tube, and having a passageway defining an inlet for gaseous fluid into said vortex tube, said passageway having a terminal opening at one end of said plug directed somewhat axially as well as circumferentially of said plug for imparting an axial component to the flow of said gaseous fluid entering said vortex tube from said passageway, said terminal opening of said passageway being characterized by a surface diverging in the direction of gaseous fluid flow.

9. A gaseous fluid inlet nozzle for a vortex tube, comprising a plug having an outer peripheral surface adapted to be received within said vortex tube, and having a passageway from end to end of said plug defining an inlet for gaseous fluid into said vortex tube, said passageway being characterized by a converging upstream surface and a diverging downstream surface.

10. In a vortex tube device for cooling a flow of gaseous substance: a tubular wall having at each end thereof an outlet opening for cooled gaseous substance; wall means at an end of said tubular wall in surrounding relation to the outlet opening thereat, said means defining a vortex tube nozzle passage adapted to admit gaseous substance to said vortex tube; and means for introducing the substance to be cooled into the nozzle passage.

11. In a vortex tube device for cooling a flow of gaseous substance: a tubular wall having at an end thereof an outlet opening for cooled gaseous substance; wall means adjacent both ends of said tubular wall defining vortex tube nozzle passages adapted to admit gaseous substance into said vortex tube at both ends thereof; and means for introducing the substance to be cooled into the nozzle passages.

12. In a vortex tube device for cooling a flow of gaseous substance: a tubular wall having at each end thereof an outlet opening for cooled gaseous substance; wall means at the ends of said tubular wall in surrounding relation to said outlet openings and defining nozzle passages arranged to direct streams of the gaseous substance toward a middle portion of the tubular wall; and means for introducing the substance to be cooled to the inlets of said nozzle passages.

13. In a vortex tube device for cooling a flow of gaseous substance: a tubular wall having adjacent one end thereof an outlet opening for cooled gaseous substance; wall means at said end defining a vortex tube nozzle passage adapted to admit gaseous substance into said vortex tube; a vortex tube nozzle adjacent the other end of said tubular wall; and means for introducing the substance to be cooled to said vortex tube nozzles.

References Cited in the file of this patent

UNITED STATES PATENTS

| | | |
|---|---|---|
| 1,522,366 | Hiller | Jan. 6, 1925 |
| 1,952,281 | Ranque | Mar. 27, 1934 |
| 2,332,336 | Norris | Oct. 19, 1943 |
| 2,519,845 | Mojonnier et al. | Aug. 22, 1950 |
| 2,581,168 | Bramley | Jan. 1, 1952 |